Patented Jan. 31, 1933

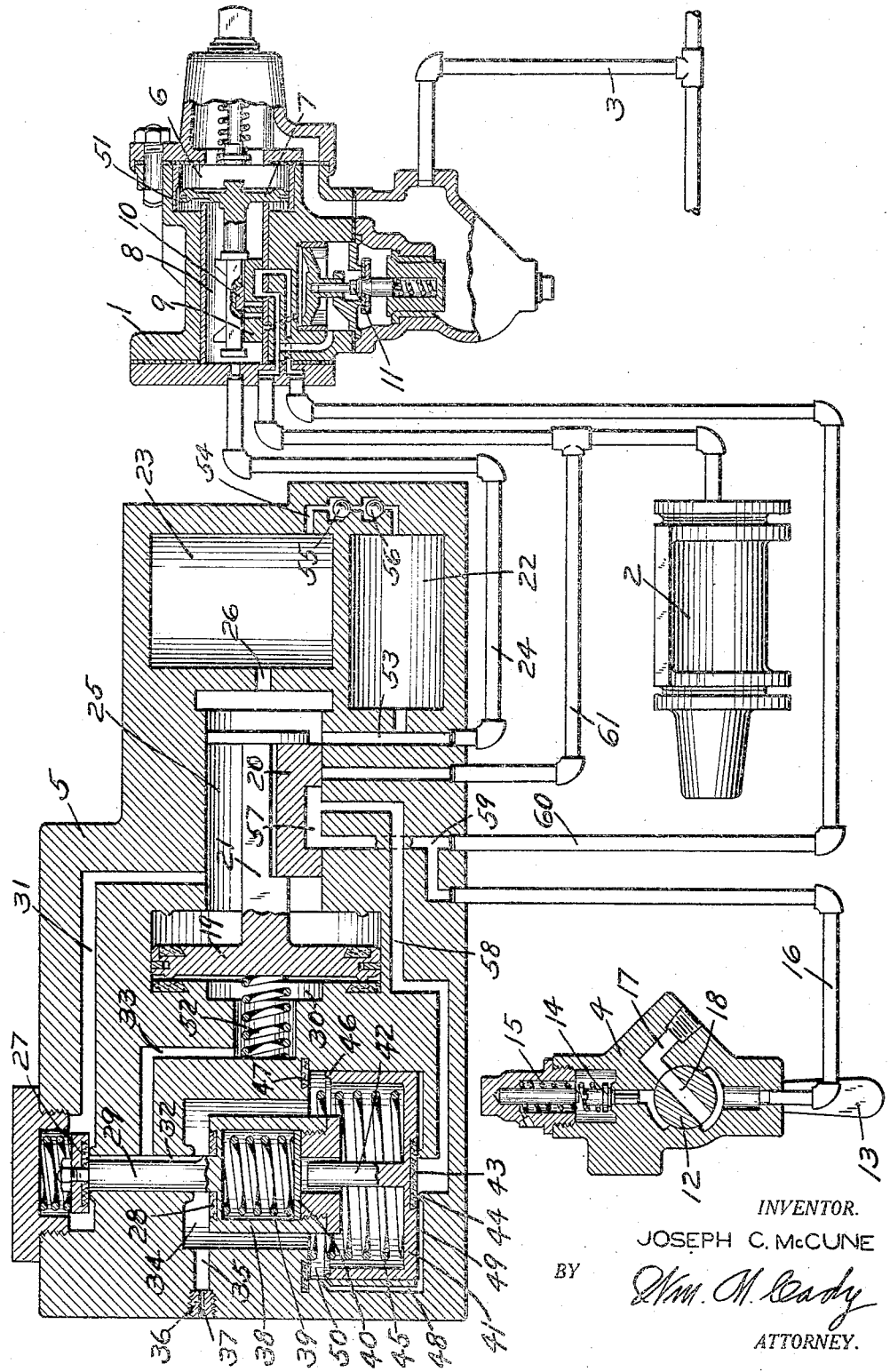

1,895,479

UNITED STATES PATENT OFFICE

JOSEPH C. McCUNE, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

FLUID PRESSURE BRAKE

Application filed September 25, 1930. Serial No. 484,294.

This invention relates to fluid pressure brakes, and more particularly to brake equipments in which retaining valve devices are employed to retain pressure in the brake cylinder when desired.

In handling trains on grades, it is customary to apply the brakes for a time and then release the brakes, so as to permit the recharge of the auxiliary reservoirs throughout the train, this operation being known as "cycling". In cycling, the retaining valve devices are turned to the retaining position, so that a degree of pressure will be retained in the brake cylinders when the triple valve devices are moved to release position, to permit the recharging of the auxiliary reservoirs.

Since pressure is retained in the brake cylinder, when a succeeding brake application is effected in the cycling operation, the brake cylinder pressure is built up to a higher degree than would otherwise be the case, due to the fact that pressure is retained in the brake cylinder from the previous brake application. After several cycles of this character, an excessive brake cylinder pressure may be built up, causing wheel sliding and difficulty in releasing the brakes.

The principal object of my invention is to provide means for automatically preventing an excessive build up in brake cylinder pressure in cycling, when the retaining valve devices are set to retain pressure in the brake cylinder.

In the accompanying drawing, the single figure is a diagrammatic sectional view of a car fluid pressure brake equipment embodying my invention.

As shown in the drawing, the equipment may comprise the usual triple valve device 1, brake cylinder 2, brake pipe 3, and retaining valve device 4, and in addition, in accordance with my invention, a compensating valve device 5.

The triple valve device 1 comprises a casing having a piston chamber 6, connected to the brake pipe 3 and containing piston 7, and having a valve chamber 8 containing a main slide valve 9 and a graduating slide valve 10 adapted to be operated by piston 7. The triple valve casing also contains the usual quick action valve mechanism 11.

The usual retaining valve device 4 comprises a casing containing a plug valve 12 adapted to be operated by a handle 13, and a pressure retaining valve 14 subject to the pressure of a spring 15 and adapted to open at a predetermined pressure. The plug valve 12 controls communication from a pipe 16, leading to the triple valve exhaust, to the retaining valve 14 and to an atmospheric exhaust port 17, a port 18 in the plug valve connecting pipe 16 to the exhaust port 17 in one position of the valve and connecting pipe 16 with the retaining valve 14 in another position.

The compensating valve device 5 comprises a casing containing a piston 19 and a slide valve 20 adapted to be operated by piston 19, through a stem 21.

The usual auxiliary reservoir volume is provided by the chambers 22 and 23, the chamber 22 being at all times in communication with the valve chamber 8, by way of pipe 24. The valve chamber 25 at one side of piston 19 is connected to the auxiliary reservoir chamber 23 through passage 26 and communication from chamber 23 to chamber 22 is controlled by slide valve 20.

For controlling the operation of piston 19, a valve device is provided comprising valves 27 and 28 connected together by a stem 29. The valve 27 controls communication from valve chamber 25 to piston chamber 30 by way of passage 31, groove 32 in the stem 29 and passage 33, and valve 28 controls communication from passage 33 to chamber 34, which is open to the atmosphere by way of passage 35, containing a choke plug 36 having a restricted exhaust port 37.

The valve 28 is associated with a cylindrical casing 38, containing a coil spring 39 which engages at its lower end, a follower plate 40. Mounted below the casing 38 and in axial alinement therewith is a valve piston 41, having a stem 42, which is adapted to engage the plate 40, when the valve piston is moved upwardly. The lower face of the valve piston 41 is provided with a valve seat 43, adapted to engage a seat rib 44, and a coil spring 45 acts on the valve piston to urge the valve seat 43 into engagement with the seat rib 44. The upper end of the valve piston 41 is provided with a seat rib 46 adapted to engage a seat 47, when the valve piston is moved upwardly.

When the valve piston 41 is at its lower seat, a restricted passage 48 connects the chamber 49 below the valve piston with chamber 50 above the valve piston.

In operation, when the brake pipe 3 is charged with fluid under pressure, fluid flows from the piston chamber 6 of the triple valve device 1, through the usual feed groove 51 around the triple valve piston 7, to valve chamber 8 and from valve chamber 8, through pipe 24 to auxiliary reservoir chamber 22.

With no fluid pressure in the system, the piston 19 will be shifted to its inner seat by spring 52, in which position, the slide valve 20 blanks passage 53, leading to auxiliary reservoir chamber 22 and pipe 24. The auxiliary reservoir chamber 23 is, however, charged with fluid under pressure from auxiliary reservoir chamber 22, by way of passage 54, containing non-return check valves 55 and 56.

Normally, the valve 27 will be seated, and the valve 28 unseated, so that piston chamber 30 is connected to the atmosphere by way of passage 33, groove 32, chamber 34, and restricted port 37. Consequently, as the pressure is built up in auxiliary reservoir chamber 23 and in valve chamber 25, the piston 19 will be shifted to its outer seated position, as shown in the drawing.

In this position, the slide valve 20 uncovers passage 53, so that valve chamber 25 and auxiliary reservoir chamber 23 are connected to auxiliary reservoir chamber 22, and so long as the parts remain in this position, the valve chamber 8 of the triple valve device is connected to both chambers 22 and 23, which together have the usual auxiliary reservoir volume.

In the normal position of slide valve 20, as shown in the drawing, a cavity 57 connects passage 58, leading to the seated area of valve 43 with passage 59, which leads to pipe 60, connected with the exhaust of the triple valve device and to pipe 16.

With the retaining valve device 4 in its direct atmospheric exhaust position, as shown in the drawing, fluid under pressure is not retained in the brake cylinder 2, and consequently pressure is not built up on the exposed area of valve piston 41, so that the parts remain in the positions shown, in applying and releasing the brakes, and the pressure built up in the brake cylinder corresponds with the usual auxiliary reservoir volume of the auxiliary reservoir chambers 22 and 23.

When the retaining valve device 4 is turned to its retaining position, however, upon increasing the brake pipe pressure after an application of the brakes to effect the movement of the triple valve piston 7 to release position, pressure is retained in the brake cylinder and this pressure acts on the exposed seated area of the valve piston 41, fluid at the retained pressure being supplied through cavity 57 in slide valve 20 and passage 58.

When the pressure has been increased so as to exceed the pressure of spring 45, the valve piston 41 is raised from its lower seat rib 44, so that the full area of the valve piston 41 is now exposed to the retained pressure. The valve piston is thus promptly shifted to its upper seat and the stem 42 operates through plate 40 and spring 39 to shift the casing 38 and stem 29, so that the valve 28 is seated, while the valve 27 is unseated.

Fluid under pressure is then supplied from valve chamber 25 to piston chamber 30, through passages 31 and 33, and the fluid pressures on opposite sides of piston 19 being thus equalized, the spring 52 shifts the piston 19 and valve 20 to the inner position, in which the slide valve 20 blanks the passage 53. The auxiliary reservoir chamber 23 is thus cut off from auxiliary reservoir chamber 22 and the triple valve chamber 8, the check valves 55 and 56 preventing back flow from chamber 23 to chamber 22. It will thus be seen that with the parts positioned as above described, upon successive applications of the brakes, the increase in brake cylinder pressure will be less than usual, since the effective auxiliary reservoir volume is only that of the chamber 22.

By properly proportioning the volume of the auxiliary reservoir chamber 22, the build up of brake cylinder pressure in cycling can be kept down to the desired extent, so as to prevent an excessive brake cylinder pressure under such conditions.

In the compensating position of slide valve 20, the cavity 57 connects pipe 61, leading to the brake cylinder, with passage 58, so that sufficient pressure is maintained under the valve piston 41 to hold same in its upper position, so long as the brake cylinder pressure is maintained and until the brakes are fully released.

The check valves 55 and 56 permit the charging of auxiliary reservoir chamber 23 and also ensures that the pressure in auxiliary reservoir chamber 22, which acts on the seat face of slide valve 20, when the slide valve is in its compensating position, will not exceed the pressure in auxiliary reservoir chamber 23 and valve chamber 25, so that there will be no tendency of the pressure in auxiliary reservoir chamber 22 to lift the slide valve 20 off its seat.

The passage 48 prevents the possible building up of pressure in chamber 49 by leakage past the valve seat 43, in the seated position of the valve piston 41.

The spring 39 and the plate 40 permit of relative movement of the stem 42 with respect to the casing 38, so as to insure that the valve 28 can seat at the same time that the seat rib 46 engages the seat 47.

It will be apparent from the foregoing, that with my invention, when the retaining valves are set to retain pressure in the brake cylinders on cars of the train, and the brakes are applied, then released so as to effect the recharge of the auxiliary reservoirs, and then reapplied, the operation being known as cycling, the auxiliary reservoir volume will be automatically reduced when a successive brake application is effected, so that in a succeeding application of the brakes, the brake cylinder pressure will not be built up to an excessive pressure which would be the case with the ordinary brake equipment, and consequently wheel sliding and difficulty in releasing the brakes will be avoided, such as is liable to occur due to the high brake cylinder pressure obtained in cycling with the ordinary brake equipment.

The above result is accomplished by providing two auxiliary reservoir volumes and valve means operative when fluid is retained in the brake cylinder for cutting off one reservoir volume from the triple valve device, so that when the triple valve is operated to supply fluid to the brake cylinder in effecting an application of the brakes with fluid pressure retained in the brake cylinder, the build up of pressure in the brake cylinder will only be that due to the supply of fluid from one of the auxiliary reservoir volumes.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake cylinder, an auxiliary reservoir, and a valve device operative to supply fluid under pressure from the auxiliary reservoir to the brake cylinder, of means operative to retain pressure in the brake cylinder, and means operative upon retaining pressure in the brake cylinder for reducing the volume of the auxiliary reservoir from which fluid under pressure is supplied to the brake cylinder by operation of said valve device in successive applications of the brakes.

2. In a fluid pressure brake, the combination with a brake cylinder, an auxiliary reservoir, and a valve device operative to supply fluid under pressure from the auxiliary reservoir to the brake cylinder, of means operative to retain pressure in the brake cylinder, and means operated by the pressure of fluid retained in the brake cylinder for cutting down the volume of the auxiliary reservoir from which fluid under pressure is supplied to the brake cylinder by operation of said valve device.

3. In a fluid pressure brake, the combination with a brake cylinder, of an auxiliary reservoir comprising two chambers, a valve device operative to supply fluid under pressure from said chambers to the brake cylinder, means operative to retain pressure in the brake cylinder, and means operated by pressure retained in the brake cylinder for cutting off communication from one of said auxiliary reservoir chambers, so that thereafter fluid under pressure is supplied from only one of said chambers to the brake cylinder by operation of said valve device.

4. In a fluid pressure brake, the combination with a brake cylinder, of an auxiliary reservoir comprising two chambers, a brake controlling valve device operative to supply fluid under pressure from said chambers to the brake cylinder, and operative in releasing the brakes to release fluid from the brake cylinder, a retaining valve device operative to retain pressure in the brake cylinder in releasing the brakes, and means operative upon retaining pressure in the brake cylinder to cut off communication from one of said auxiliary reservoir chambers, so that thereafter, fluid under pressure is only supplied from the other chamber to the brake cylinder by operation of said brake controlling valve device.

5. In a fluid pressure brake, the combination with a brake cylinder, of an auxiliary reservoir comprising two chambers, a brake controlling valve device operative to supply fluid under pressure from said chambers to the brake cylinder, and operative in releasing the brakes to release fluid from the brake cylinder, a retaining valve device operative to retain pressure in the brake cylinder in releasing the brakes, a cut-off valve device operative to cut off communication through which fluid under pressure is supplied from one of said chambers to the brake cylinder by operation of said controlling valve device, and valve means operative by pressure retained in the brake cylinder for effecting the operation of said cut-off valve device.

6. In a fluid pressure brake, the combination with a brake cylinder, of an auxiliary reservoir comprising two chambers, a brake pipe, a triple valve device operated upon a reduction in brake pipe pressure for supplying fluid under pressure from said auxiliary reservoir to the brake cylinder and upon an increase in brake pipe pressure for releasing fluid fom the brake cylinder, a retaining valve device operative to retain pressure in the brake cylinder in releasing the brakes, a cut-off valve device operative by a variation in fluid pressure for cutting off communication from one chamber to said triple valve device, and valve means operative by pressure retained in the brake cylinder for varying the pressure in said cut-off valve device.

7. In a fluid pressure brake, the combination with a brake cylinder, of an auxiliary reservoir comprising two chambers, a brake pipe, a triple valve device operated upon a reduction in brake pipe pressure for supplying fluid under pressure from said auxiliary reservoir to the brake cylinder and upon an increase in brake pipe pressure for releasing fluid from the brake cylinder, a retaining valve device operative to retain pressure in the brake cylinder in releasing the brakes, a cut-off valve device operative by a variation in fluid pressure for cutting off communication from one chamber to said triple valve device, and valve means operative by pressure retained in the brake cylinder for varying the pressure in said cut-off valve device, communication through which fluid under pressure retained in the brake cylinder is supplied to said valve means being controlled by said cut-off valve device.

In testimony whereof I have hereunto set my hand, this 22 day of Sept., 1930.

JOSEPH C. McCUNE.